United States Patent
Sakai et al.

(10) Patent No.: US 11,493,788 B2
(45) Date of Patent: Nov. 8, 2022

(54) OPTICAL MODULATOR

(71) Applicant: SUMITOMO OSAKA CEMENT CO., LTD., Tokyo (JP)

(72) Inventors: Takeshi Sakai, Tokyo (JP); Toshio Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 42 days.

(21) Appl. No.: 17/170,034

(22) Filed: Feb. 8, 2021

(65) Prior Publication Data

US 2021/0302766 A1    Sep. 30, 2021

(30) Foreign Application Priority Data

Mar. 31, 2020  (JP) .............................. JP2020-062097

(51) Int. Cl.
*G02F 1/035* (2006.01)
*G02F 1/21* (2006.01)

(52) U.S. Cl.
CPC ............ *G02F 1/0356* (2013.01); *G02F 1/212* (2021.01)

(58) Field of Classification Search
None
See application file for complete search history.

(56) References Cited

U.S. PATENT DOCUMENTS

| 7,400,787 B2* | 7/2008 | Burns | G02F 1/2255 |
| | | | 385/3 |
| 7,447,389 B2* | 11/2008 | Sugiyama | G02F 1/0316 |
| | | | 385/9 |
| 8,983,239 B2* | 3/2015 | Ichioka | G02F 1/3137 |
| | | | 385/16 |
| 2014/0133794 A1 | 5/2014 | Kono | |
| 2018/0017839 A1 | 1/2018 | Hosokawa et al. | |
| 2021/0302766 A1* | 9/2021 | Sakai | G02F 1/212 |

FOREIGN PATENT DOCUMENTS

| JP | 2014-112219 A | 6/2014 |
| JP | 2016-194577 A | 11/2016 |

* cited by examiner

*Primary Examiner* — Rhonda S Peace
(74) *Attorney, Agent, or Firm* — IpHorgan Ltd.

(57) ABSTRACT

An optical modulator includes a substrate on which an optical waveguide and a modulation electrode that modulates a light wave propagating through the optical waveguide are formed, and a case housing the substrate, the optical waveguide includes at least an optical branching part that branches one light wave into two light waves or an optical combining part that combines two light waves into one light wave, the modulation electrode has a signal electrode and a ground electrode, and a part of the signal electrode is disposed so as to cross the optical branching part or the optical combining part, and the optical modulator is provided with a suppressing unit that suppresses changes in an intensity ratio of the light waves branched at the optical branching part or an intensity ratio of the light waves combined at the optical combining part, by the signal electrode.

9 Claims, 10 Drawing Sheets

OPTICAL MODULATOR

CROSS-REFERENCE TO RELATED APPLICATIONS

This application claims the benefit of Japanese Patent Application No. 2020-062097 filed Mar. 31, 2020, the disclosure of which is herein incorporated by reference in its entirety.

BACKGROUND OF THE INVENTION

Field of the Invention

The present invention relates to an optical modulator, in particular, an optical waveguide in which an optical waveguide formed on a substrate has an optical branching part or an optical combining part, and a signal electrode constituting a modulation electrode crosses the optical branching part or the optical combining part.

Description of Related Art

In the fields of optical communication and optical measurement, optical modulators are often used in which an optical waveguide and a modulation electrode for modulating a light wave propagating through the optical waveguide are formed on a substrate having an electro-optic effect, such as lithium niobate (LN).

Figure 1:
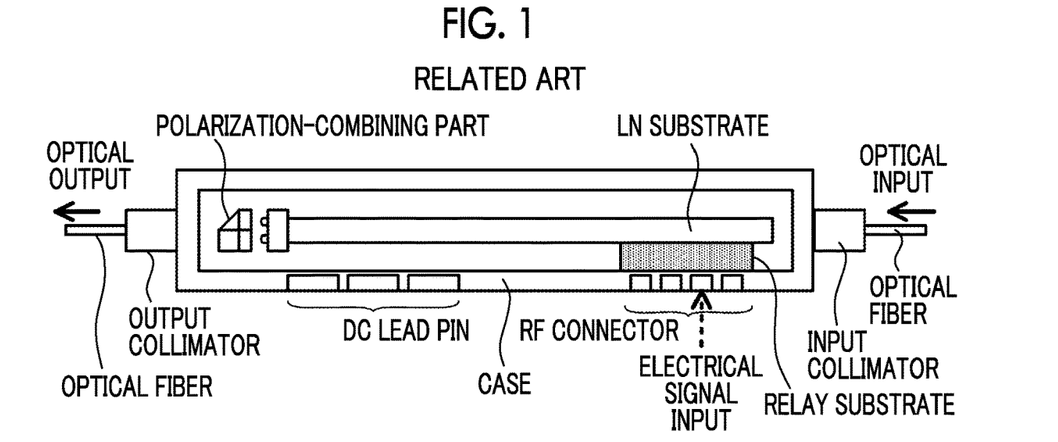
FIG. 1 is a plan view showing an outline of an optical modulator in the related art.

FIG. 1 is a plan view showing an example of an optical modulator such as a DP-QPSK modulator, and an LN substrate on which an optical waveguide and a modulation electrode are formed is housed in a case. Light wave input by the optical fiber on the input side of the LN substrate is introduced into the optical waveguide of the LN substrate through an input collimator or the like. Further, on the output side of the LN substrate, the modulated light wave is introduced into the optical fiber on the output side via a polarization combining optical system, an output collimator, or the like, and is output as an optical output.

An electrical signal introduced via an RF connector or the like provided on the side surface of the case is applied to the modulation electrode of the LN substrate. When an electrical signal is input to the LN substrate, it is also possible to use the electric wiring formed on a relay substrate. Further, the electrodes formed on the LN substrate also include DC electrodes for applying a DC bias voltage. A DC bias is supplied to the DC electrode of the LN substrate via a DC lead pin formed on the side surface of the case.

Figure 2:
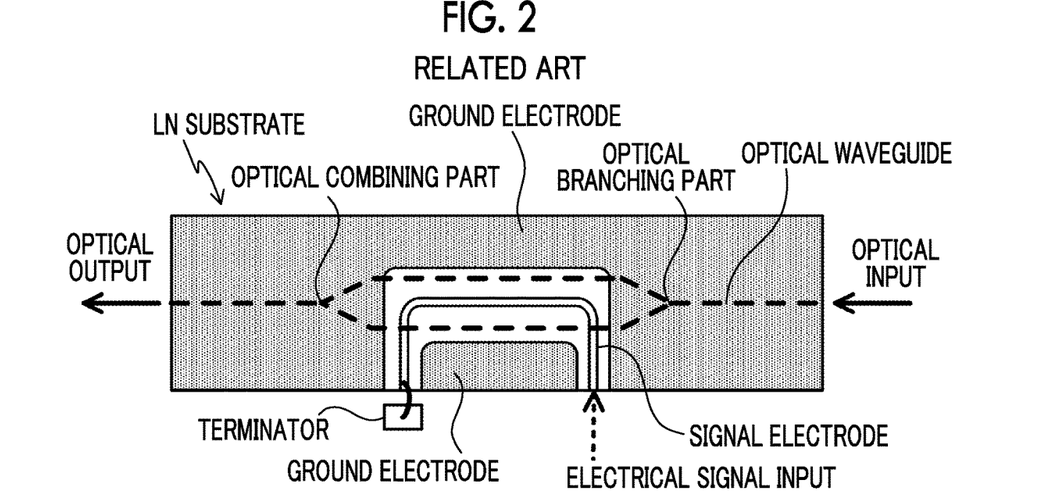
FIG. 2 is a plan view showing an outline of an optical modulation element in the related art.

FIG. 2 is a plan view showing an example of the LN substrate. In FIG. 2, for simplification of the description, one Mach-Zehnder type optical waveguide is formed and disposed in the optical waveguide formed on the LN substrate. The shape of the optical waveguide is not limited to this, and a so-called nested optical waveguide in which a sub-Mach-Zehnder type optical waveguide is nested in each branch waveguide constituting one main Mach-Zehnder type optical waveguide is also used. Further, in a DP-QPSK modulator or the like shown in FIG. 1, a configuration of an optical waveguide in which one optical waveguide is branched into two optical waveguides and a nested optical waveguide is connected to each of the branched optical waveguides is also adopted.

In the optical modulator as shown in FIGS. 1 and 2, the position of input light (optical input) supplied from the outside to the optical waveguide, and the position of output light (optical output), which is the output of the light wave modulated by the electrical signal supplied from the outside to the modulation electrode, are disposed in both ends in the longitudinal direction of the substrate (the shorter side portions of the rectangular substrate). An optical waveguide and a modulation electrode are formed on the LN substrate of FIG. 2. The modulation electrode has a signal electrode and a ground electrode, and in particular, the signal electrode is introduced from the side surface along the longitudinal direction of the substrate (the long side portion of a rectangular substrate, the lower side of the LN substrate in FIG. 2), and is derived from the same side surface side or the opposite side surface side. A terminator for terminating an electrical signal (modulated signal) is connected to the end of the signal electrode.

When the signal electrode is introduced from the long side portion of the substrate as shown in FIG. 2, as shown in Japanese Laid-Open Patent Publication No. 2016-194577, the signal electrode is likely to be disposed in the vicinity of the straight line portion of the branch waveguide or across the input waveguide or the like, avoiding the optical branching part or the optical combining part of the Mach-Zehnder type optical waveguide. In this case, when the signal electrode crosses the optical waveguide, it does not affect the light intensity ratio (branch ratio) of the optical branching part such as the Y-branch part. Similarly, it does not affect the intensity ratio (combination ratio) of the light waves that are combined at the optical combining part.

On the other hand, the higher the speed of the electrical signal to be transmitted (for example, 50 GHz or more), the larger the transmission loss, so that it is necessary to shorten the electrical signal line for transmitting the electrical signal, from a digital signal processor (DSP) that can generate an electrical signal at a predetermined phase and timing to a driver for amplifying the signal and driving the modulator, and from the driver to the LN modulation element (the signal electrode of the LN substrate).

Figure 3:
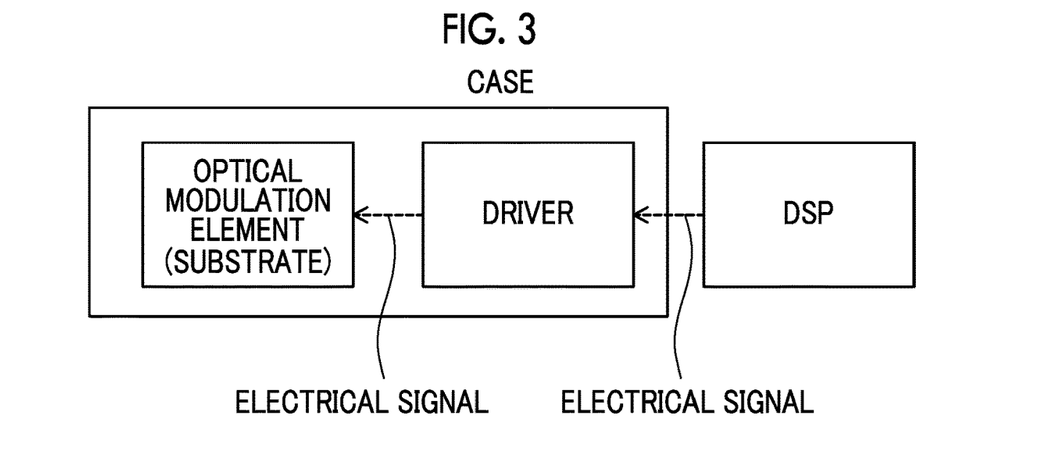
FIG. 3 is a diagram illustrating a state in which a DSP, a driver element, and an optical modulation element are disposed substantially linearly.

In order to reduce the transmission loss, as shown in FIG. 3, it is required to dispose the DSP, the driver, and the optical modulation element in a substantially linear line, and to minimize the length and bending of the signal line. Further, so-called integration is also performed in which not only the LN substrate which is an optical modulation element but also a driver element is incorporated in the case of the optical modulator.

Figure 4A:
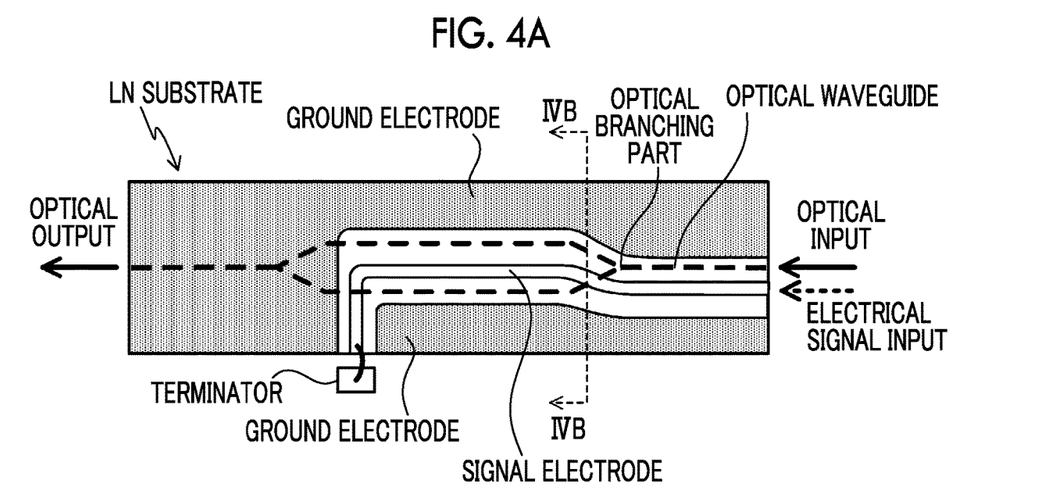

When these are performed, unlike the optical modulator as shown in FIG. 2, by inputting the electrical signal not from the long side portion of the LN substrate along the longitudinal direction, but from the short side portion of the LN substrate, as shown in FIG. 4A, the signal line can be shortened and the signal line can be disposed linearly.

Figure 4B:
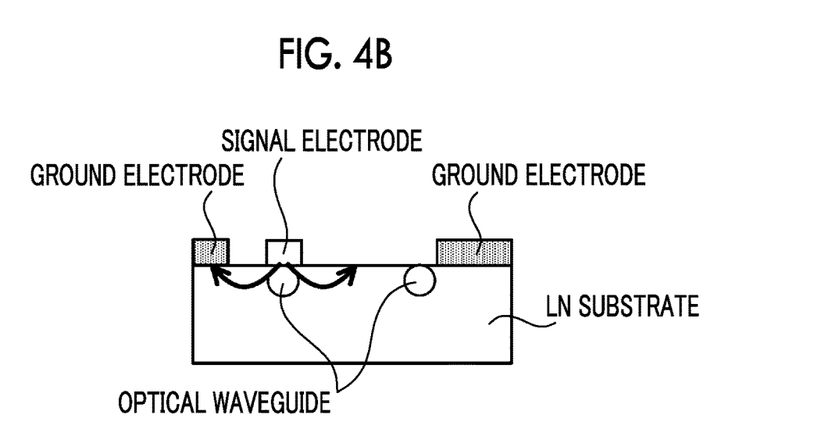
FIG. 4B is a cross-sectional view taken along a dotted line IVB-IVB' of FIG. 4A.

When the electrical signals are input from the shorter side portion of the LN substrate (right short side of the LN substrate in FIG. 4A) as in Japanese Laid-Open Patent Publication No. 2014-112219 and FIG. 4A, the signal electrode is likely to be disposed across the optical branching part such as a Mach-Zehnder type optical waveguide. Therefore, when the signal electrode crosses the optical waveguide, for example, as shown in FIG. 4B, an electric field is applied to one of the two branch waveguides constituting the optical branching part such as the Y branch part, which affects the branch ratio of light. FIG. 4B is a cross-sectional view taken along the dotted line IVB-IVB' of FIG. 4A.

Further, as will be described later, even when the signal electrode is disposed directly above the input waveguide connected to the optical branching part, and the signal electrode crosses the center of the Y-branch part, in the vicinity immediately after the branch of the two branch waveguides constituting the Y-branch part, modulation electric fields in different directions are respectively applied to branch waveguides, and different refractive index changes occur in the two branch waveguides. Therefore, it causes a change in the branch ratio of the light wave to be branched into the two branch waveguides.

In the case of the DP-QPSK modulator, when the branch ratio fluctuates at the Y-branch part of the first stage where a light wave is branched into X-polarized wave and Y-polarized wave, the loss difference between X-polarized wave and Y-polarized wave changes. Further, in the case of the Y-branch part of the nested optical waveguide, the extinction ratio of the output signal light changes, which causes deterioration of transmission characteristics in any case.

SUMMARY OF THE INVENTION

An object to be solved by the present invention is to solve the above-described problems and to provide an optical modulator in which deterioration of transmission characteristics is suppressed even when a signal electrode crosses an optical branching part or an optical combining part.

In order to solve the above problem, an optical modulator of the present invention has the following technical features.

(1) Provided is an optical modulator including a substrate on which an optical waveguide and a modulation electrode that modulates a light wave propagating through the optical waveguide are formed; and a case housing the substrate, the optical waveguide includes at least an optical branching part that branches one light wave into two light waves or an optical combining part that combines two light waves into one light wave, the modulation electrode has a signal electrode and a ground electrode, and a part of the signal electrode is disposed so as to cross the optical branching part or the optical combining part, the optical modulator is provided with a suppressing unit that suppresses changes in an intensity ratio of the light waves branched at the optical branching part or an intensity ratio of the light waves combined at the optical combining part, by the signal electrode that crosses the optical branching part or the optical combining part.

(2) In the optical modulator according to the above (1), an interface part that is provided in the case, and supplies electrical signals to the modulation electrode may be formed in a vicinity of a position in which an extension line of a line-symmetry axis of the optical branching part or the optical combining part, which is a propagation direction of the light wave passing through the optical branching part or the optical combining part, intersects with a side surface of the case.

(3) In the optical modulator according to the above (1), the optical branching part or the optical combining part may include a Y-branch part, the Y-branch part may include one input and output waveguide having a waveguide width W corresponding to a single mode, a conversion waveguide connected to the input and output waveguide and having a waveguide width wider than the waveguide width W, and two branch waveguides connected to the conversion waveguide, and a position where the signal electrode crosses the optical branching part or the optical combining part may be the conversion waveguide or any one of the two branch waveguides within a range from the conversion waveguide to the two branch waveguides between which a distance is separated by three times a mode field diameter of the light wave propagating through the branch waveguides.

(4) In the optical modulator according to the above (3), the suppressing unit may be a resin layer provided between the optical branching part or the optical combining part and the modulation electrode.

(5) In the optical modulator according to the above (4), a length of a portion where the modulation electrode and the resin layer overlap may be set to $1/10$ or less of a wavelength of a modulation signal.

(6) In the optical modulator according to the above (3), the suppressing unit may be disposed along a line-symmetry axis of the optical branching part or the optical combining part, which is a propagation direction of the light wave passing through the optical branching part or the optical combining part, and have a shape symmetrical with respect to the line-symmetry axis, and a width of the signal electrode may be at least three times the mode field diameter of the light wave propagating through the branch waveguide, in the position where the signal electrode crosses the optical branching part or the optical combining part.

According to the present invention, provided is an optical modulator in which an optical waveguide and a modulation electrode that modulates a light wave propagating through the optical waveguide are formed on a substrate, and the substrate is housed in a case, the optical waveguide includes at least an optical branching part that branches one light wave into two light waves or an optical combining part that combines two light waves into one light wave, the modulation electrode has a signal electrode and a ground electrode, and a part of the signal electrode is disposed so as to cross the optical branching part or the optical combining part, the optical modulator including a suppressing unit that suppresses changes in an intensity ratio of the light waves branched at the optical branching part or an intensity ratio of the light waves combined at the optical combining part, due to the signal electrode that crosses the optical branching part or the optical combining part is provided, so that it is possible to provide an optical modulator in which deterioration of transmission characteristics is suppressed.

BRIEF DESCRIPTION OF THE DRAWINGS

FIGS. 4A and 4B are diagrams illustrating an example of an optical modulation element in which a signal electrode crosses an optical branching part of an optical waveguide. FIG. 4A is a plan view.

FIGS. 6A and 6B are diagrams illustrating an example (1) of the optical modulation element used in an optical modulator of the present invention.

FIG. 6A is a plan view.

FIGS. 7A and 7B are diagrams illustrating an example (2) of the optical modulation element used in the optical modulator of the present invention.

FIG. 7A is a plan view.

DETAILED DESCRIPTION OF THE INVENTION

Hereinafter, an optical modulator according to the present invention will be described in detail with reference to preferred examples.

The optical modulator of the present invention is intended for optical modulators configured such that a signal electrode crosses the optical branching part or the optical combining part of an optical waveguide, as shown in FIG. 6A, 6B, 7A, 7B, 9, 11 or 12.

Figure 6A:
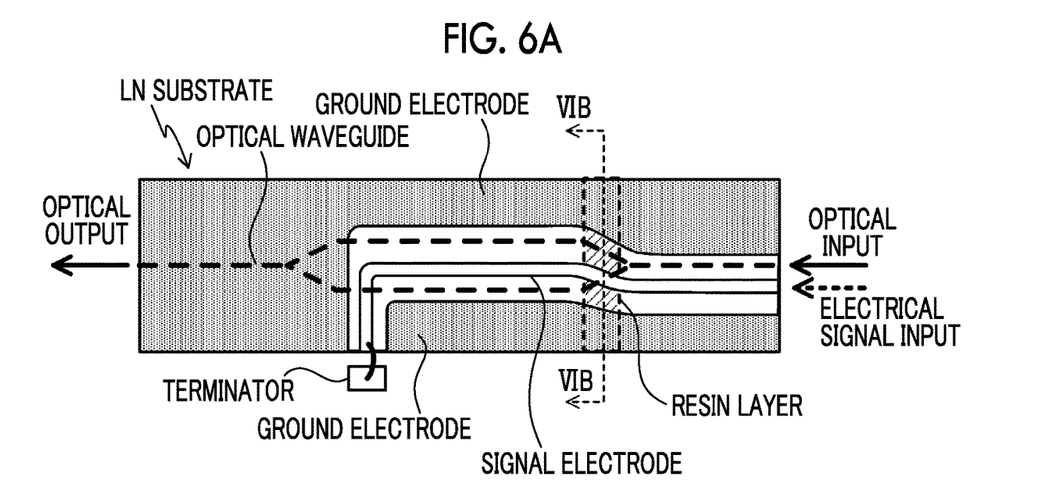
Figure 6B:
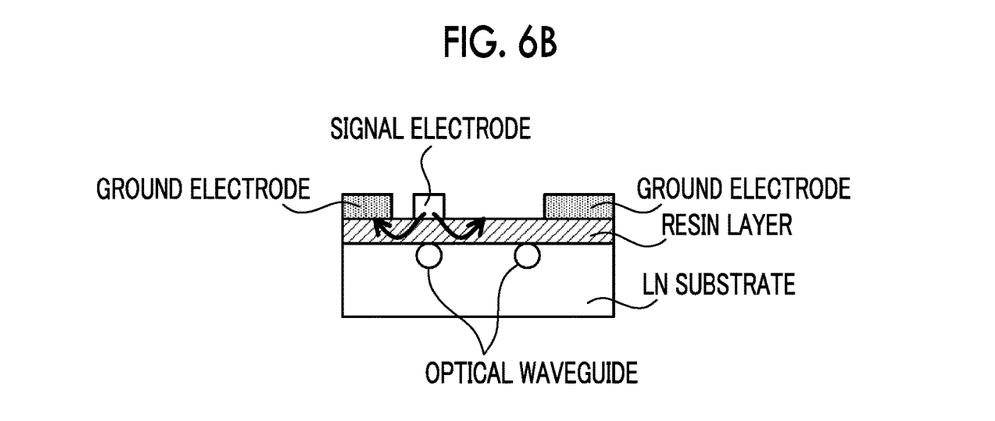
FIG. 6B is a cross-sectional view taken along a dotted line VIB-VIB' of FIG. 6A.
Figure 8:
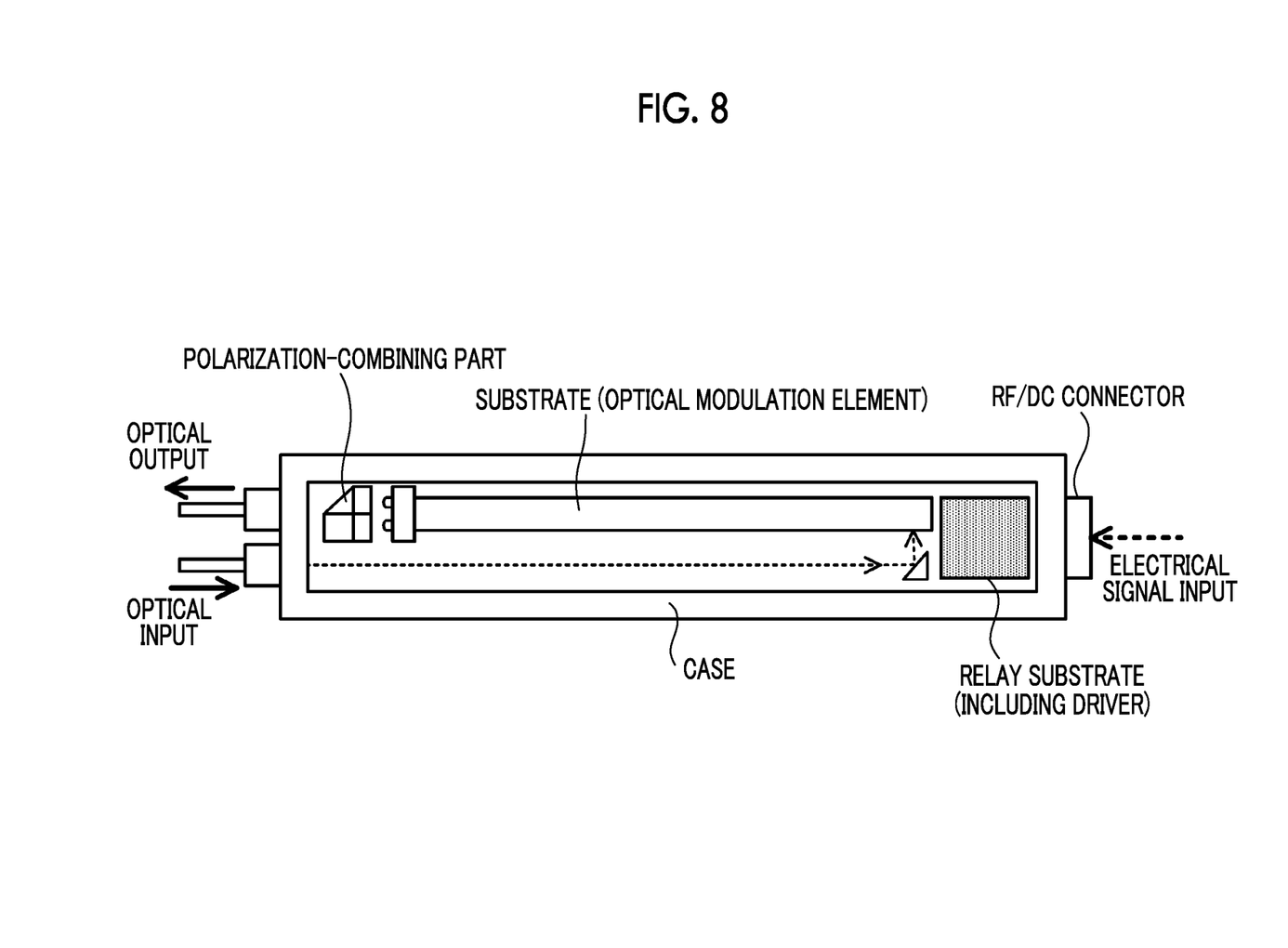
FIG. 8 is a plan view illustrating a state in a case of the optical modulator of the present invention.
Figure 10:
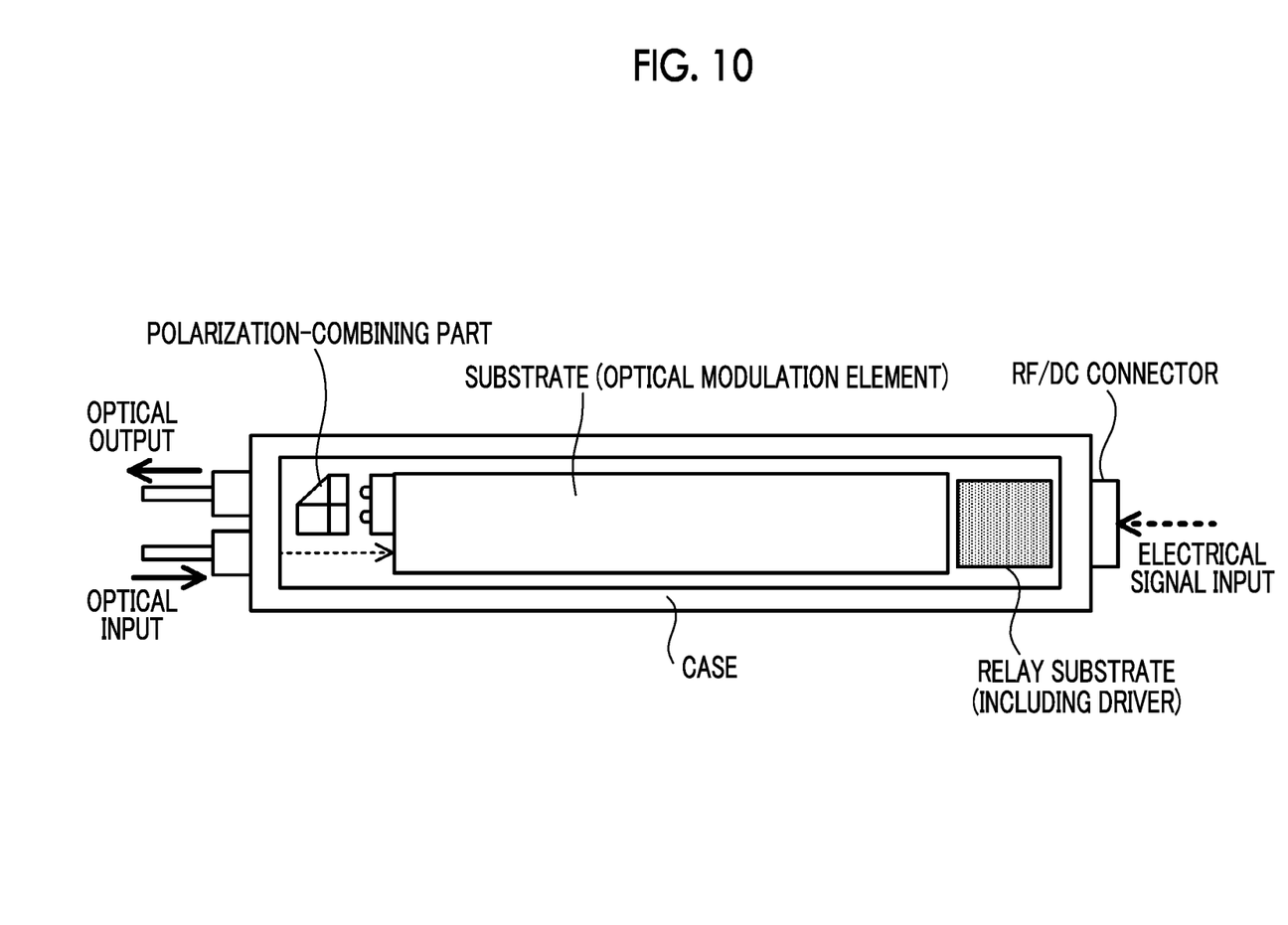
FIG. 10 is a plan view illustrating another state in the case of the optical modulator of the present invention.

Specifically, in an optical modulator in which an optical waveguide and a modulation electrode that modulates a light wave propagating through the optical waveguide are formed on a substrate, as shown in FIG. 6A, 6B or the like, and the substrate is housed in a case, as shown in FIG. 8 or 10, the optical waveguide includes at least an optical branching part that branches one light wave into two light waves or an optical combining part that combines two light waves into one light wave, the modulation electrode has a signal electrode and a ground electrode, and a part of the signal electrode is disposed so as to cross the optical branching part or the optical combining part, the optical modulator includes a suppressing unit that suppresses changes in an intensity ratio of the light waves branched at the optical branching part or an intensity ratio of the light waves combined at the optical combining part, by the signal electrode that crosses the optical branching part or the optical combining part.

As the substrate used in the optical modulator of the present invention, a substrate having an electro-optic effect such as lithium niobate (LN), a semiconductor substrate, or the like can be used. For the optical waveguide, it is possible to use a known technique, for example, such as forming an optical waveguide by LN crystal growth and LN substrate processing, or forming a waveguide by thermally diffusing a metal such as Ti on the LN substrate. Further, for the electrode, it is possible to use a known technique such as forming the electrode by gold plating. In the description of the present invention, the substrate (chip) on which the optical waveguide and electrodes are formed may be referred to as an "optical modulation element".

In the optical modulator of the present invention, as shown in FIG. 3, 8 or 10, to supply an electrical signal to the modulation electrode of the optical modulation element disposed in the case, an interface part (RF/DC connector, in particular, RF connector in FIG. 8 or 10) to be provided in the case is formed in a vicinity of a position in which an extension line of a line-symmetry axis of the optical branching part or the optical combining part, which is a propagation direction (the left-right direction in the drawings) of the light wave passing through the optical branching part or the optical combining part, intersects with a side surface of the case. As a result, the DSP can be disposed in a vicinity of the outside of the interface part, the driver element can be disposed in a vicinity of the inside of the interface part in the case, and the optical modulation element can be disposed on the side opposite to the interface part of the driver element. Then, the DSP and the optical modulation element (modulation electrode) can be connected substantially linearly with shorter wiring, and the transmission loss of the electrical signal can be suppressed to the minimum.

Figure 11:
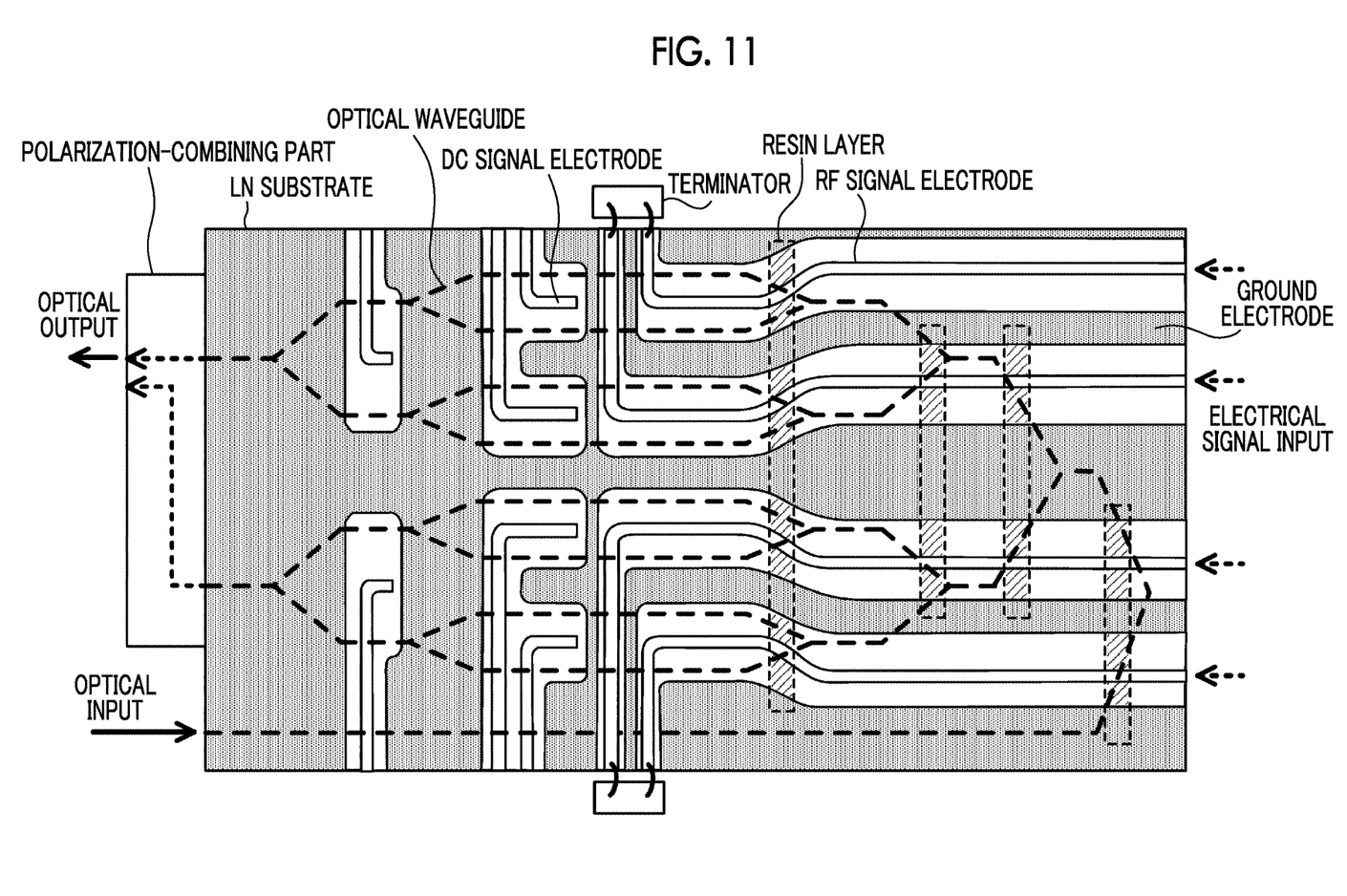
FIG. 11 is a diagram illustrating an example (4) of the optical modulation element used in the optical modulator of the present invention.
Figure 12:
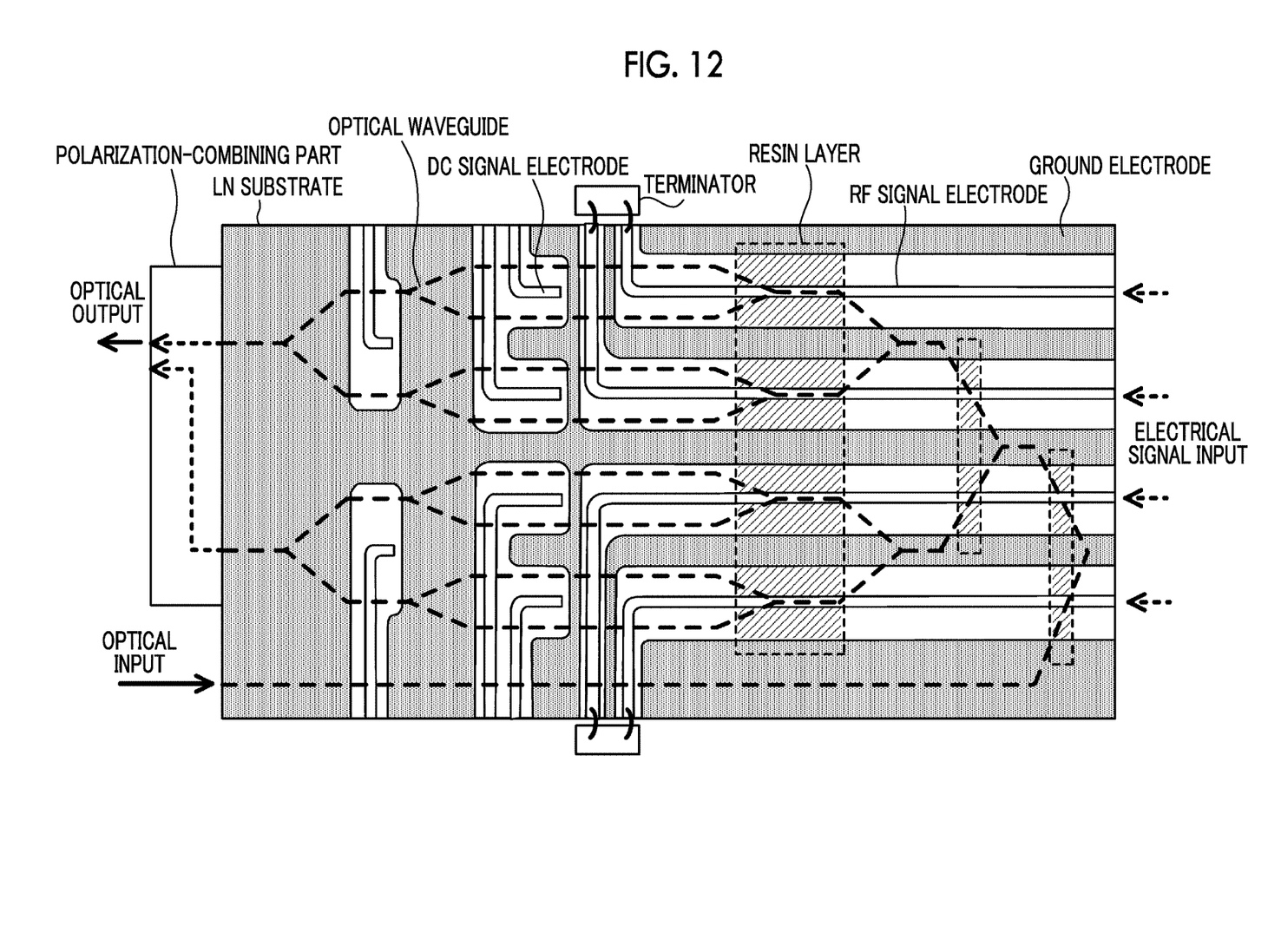
FIG. 12 is a diagram illustrating an example (5) of the optical modulation element used in the optical modulator of the present invention.

In FIG. 8 or 10, the RF/DC connector, which is an interface part, is disposed on the short side of the case, and the optical input/optical output ports are disposed on the opposite short side. The optical input port can also be disposed on the long side of the case (the long side on the lower side of the drawing). In the case of FIG. 8, the optical input port to the optical modulation element itself is disposed on the long side of the substrate, and the light wave introduced from the optical input port of the case is input to the optical waveguide of the substrate constituting the optical modulation element via the space optical system. Further, as shown in FIG. 10, the optical input port and the optical output port are disposed on the short side of the same substrate, and as shown in FIG. 11 or 12 described later, it is also possible to configure the optical waveguide in which the folded optical path from the optical input port to the optical modulation unit (a part of the optical waveguide where light waves are subjected to the modulation action by the modulation signal) is formed in the substrate.

In the optical modulation unit inside the substrate, light waves propagate from the right to the left in FIG. 8 or 10, are output from the edge of the substrate after undergoing a light modulation action, polarized and combined by the space optical system including the polarization-combining part, and output from the optical output port. The electrical signal also propagates through the modulation electrode (signal electrode) in the substrate from the right to the left in FIG. 8 or 10. A relay substrate including a driver element is disposed in the vicinity of the interface part in the case, and a modulation signal is transmitted via the shortest path from the interface part to the relay substrate, and from the relay substrate to the optical modulation element (substrate).

In order to suppress the transmission loss in the signal electrode for propagating the electrical signal, as shown in FIG. 4A, 4B, the area from the input terminal of the signal electrode to the interaction region between the optical waveguide and the modulation electrode is required to have a substantially linear shape. As a result, the signal electrode crosses the optical branching part of the optical waveguide.

Figure 5:
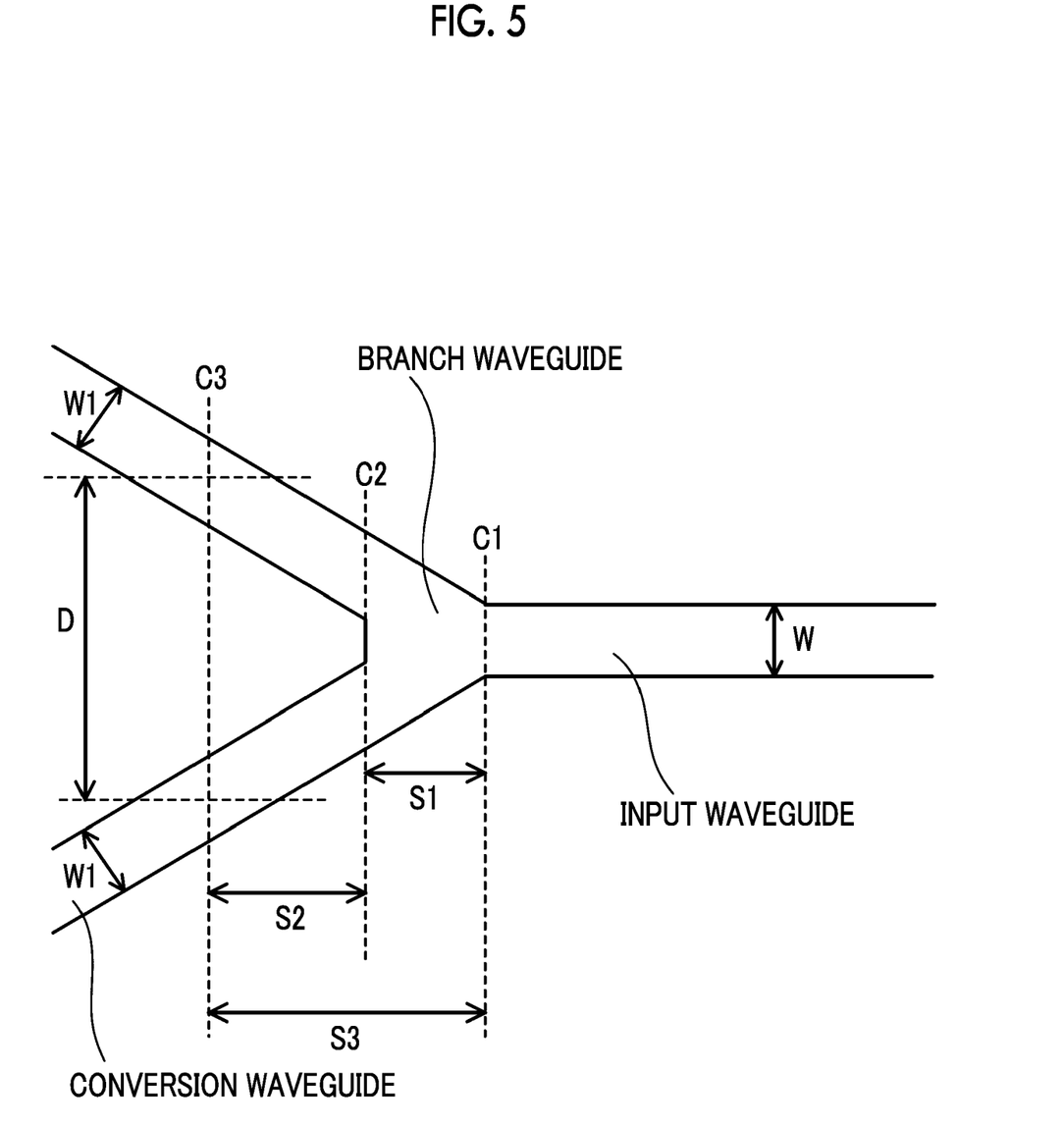
FIG. 5 is a diagram illustrating a shape of a Y-branch part used for an optical branching part.

FIG. 5 is an enlarged view showing an example of an optical branching part using the Y-branch part. The optical branching part includes the input waveguide on the right side from a dotted line C1, the conversion waveguide in the section from the dotted line C1 to a dotted line C2, and the branch waveguide on the left side from a dotted line C2. It is possible to adopt the Y-branch part for the configuration of the optical combining part, in which case two branch waveguides are connected to the conversion waveguide, and is connected to one output waveguide via the conversion waveguide. For example, the shape is such that the light propagation direction of the Y-branch part in FIG. 5 is an opposite direction (direction from the left to the right in FIG. 5). In the following, the description will be focused on the optical branching part, but even when the signal electrode crosses a part of the optical combining part, it is possible to suppress the change in the intensity ratio of the combined light wave, by applying the present invention. Although the Y-branch part is shown in FIG. 5, the present invention can also be applied to other optical branching units such as a multimode interference waveguide (MMI) and a coupler.

The optical branching part includes an input waveguide having a waveguide width W corresponding to the single mode, a conversion waveguide connected to the input waveguide and formed between one end having a waveguide width which is the same as the W and the other end having a waveguide width wider than the W, and two branch waveguides connected to the conversion waveguide. In the present invention, when the position where the signal electrode crosses the optical branching part is the conversion waveguide or any one of the two branch waveguides within a range from the conversion waveguide to the two branch waveguides between which the distance D is separated by three times the mode field diameter of the light wave propagating through the branch waveguide, it has been found that the branch ratio of the light wave at the optical branching part changes from a desired set value, for example, 1:1, and thus the optical modulator of the present invention has been completed.

When the signal electrode crosses the optical waveguide within the range from the dotted line C1 to the dotted line C3, shown in FIG. 5, (distance D is three times the mode field diameter of the single mode of the light wave propagating through the branch waveguide), the branch ratio of the light wave at the optical branching part is likely to change from the set value (for example, 1:1). In the present invention, the meaning of "the signal electrode crosses the optical branching part or the optical combining part" is that the signal electrode is disposed within the range from the dotted line C1 to the dotted line C3 of the Y-branch part shown in FIG. 5.

In order to suppress the change in the branch ratio, as shown in FIG. 6A, 6B, a resin layer is provided as a suppressing unit between the optical waveguide constituting the optical branching part and the modulation electrode (signal electrode and ground electrode (GND)). The resin layer is a resin such as a thermoplastic resin or a thermosetting resin, and examples include a polyamide resin, a melamine resin, a phenol resin, an amino resin, an epoxy resin, or the like. Further, as the resin layer, for example, a permanent resist can be used, and a photoresist material made of a thermosetting resin can be used. In the manufacturing process of the optical modulation element, a resin layer is applied on the substrate by spin coating, patterning is performed by a normal photolithography process, and then thermosetting is performed to dispose the resin layer between the modulation electrode and the substrate. Further, the refractive index of the resin layer needs to be selected to be lower than the optical refractive index of the core portion of the optical waveguide.

Further, by using a permanent resist, there are advantages such as easy patterning and a thick film formation with a thickness of 3 to 5 μm. In the configuration of the present invention, a buffer layer (SiO2 film) may be put on the surface of the substrate, but when the buffer layer is as thin as about 1 μm, the effect as in the present invention cannot be obtained.

FIG. 6B shows a cross-sectional view taken along the dotted line VIB-VIB' of FIG. 6A. As shown in FIG. 6B, by disposing the resin layer as the suppressing unit, the electric field formed between the signal electrode and the ground electrode is suppressed from being applied to one of the branch waveguides (the optical waveguide on the right side of FIG. 6B). Thus, an extra electric field is not applied to the branch waveguide that constitutes the optical branching part, and the change in the branch ratio of the branching light wave is suppressed. The resin layer may be locally provided at the signal electrode or a place where the signal electrode and the ground electrode cross the optical waveguide, or can be formed widely on the surface of the substrate except for the action portion where the electric field formed by the electrodes such as the modulation electrode and the DC electrode interact with the optical waveguide.

As shown in FIG. 6A, 6B, when the resin layer is disposed in the middle of the transmission channel of the modulation electrode including the signal electrode, the characteristic impedance of the modulation electrode changes between the portion where the resin layer exists and the portion where the resin layer does not exist. When the length of the overlapped portion of the modulation electrode and the resin layer is 1/10 or less of the wavelength of the modulation signal, the effect of the change in the characteristic impedance is extremely small, but when the length is longer than that, it is necessary to devise ways to suppress changes in the characteristic impedance. Specifically, it is conceivable to make the width of the signal electrode on the resin layer wider than other parts, or the gap width between the signal electrode and the ground electrode on the resin layer narrower than other parts. Further, when changing the width of the signal electrode or the gap width, the changing portion may be continuously adjusted in a tapered shape.

Figure 7A:
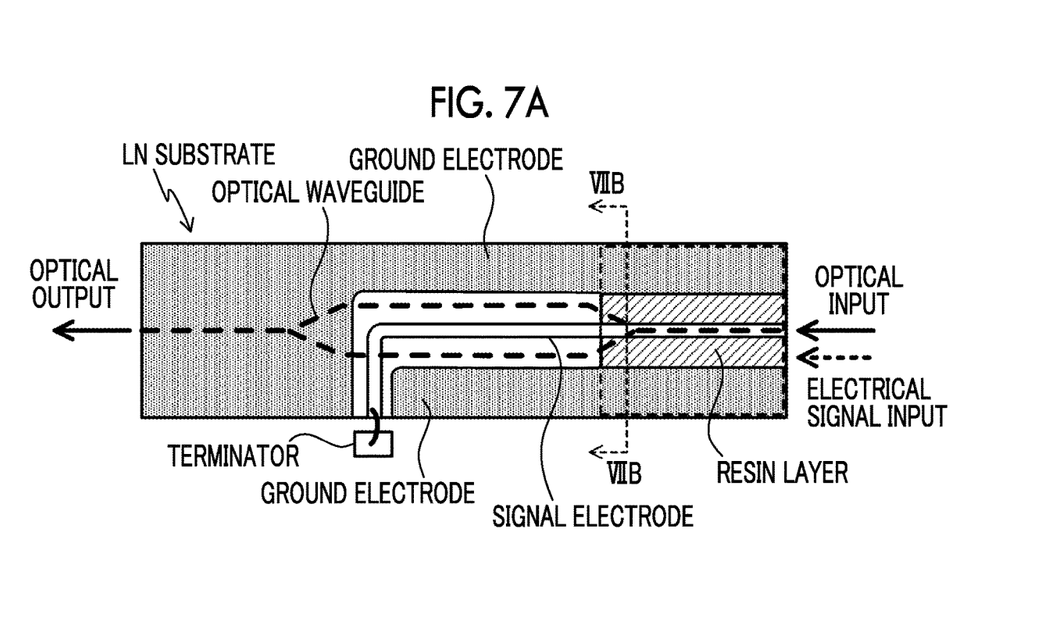
Figure 7B:
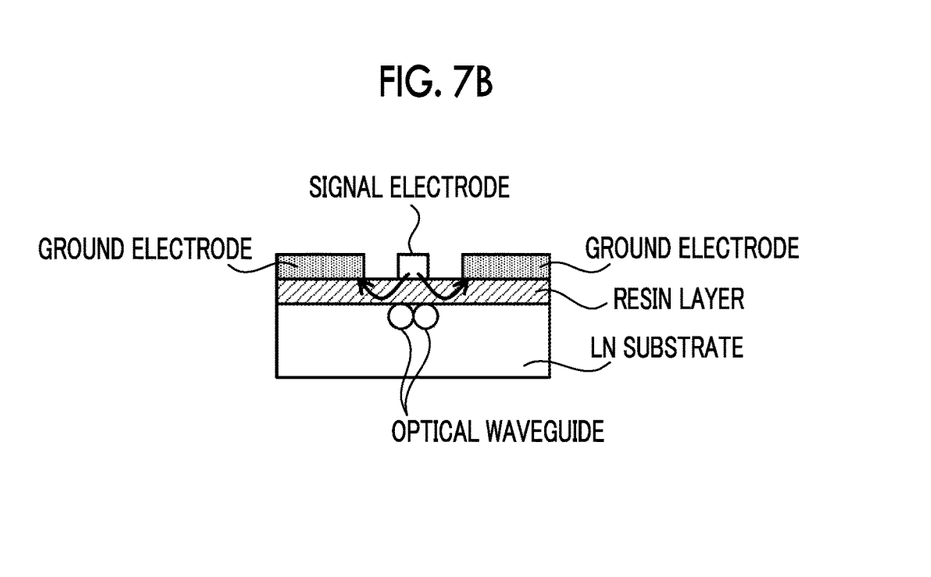
FIG. 7B is a cross-sectional view taken along a dotted line VIIB-VIIB' of FIG. 7A.

FIG. 7A, 7B show a case where the signal electrodes are disposed so as to overlap the input waveguide of the Mach-Zehnder type optical waveguide of FIG. 6A, 6B. Further, FIG. 7B shows a cross-sectional view taken along the dotted line VIIB-VIIB' of FIG. 7A. In particular, FIG. 7B shows a state immediately after the branch waveguide constituting the optical branching part is branched. Even in a situation where such branch waveguides are disposed close to each other, by disposing the resin layer as the suppressing unit, the action of different electric fields (electric fields in different directions) respectively in the two branch waveguides is suppressed, and different refractive index changes are prevented from occurring in the two branch waveguides. As a result, the change in the branch ratio of the light wave branched into the two branch waveguides is suppressed.

Figure 9:
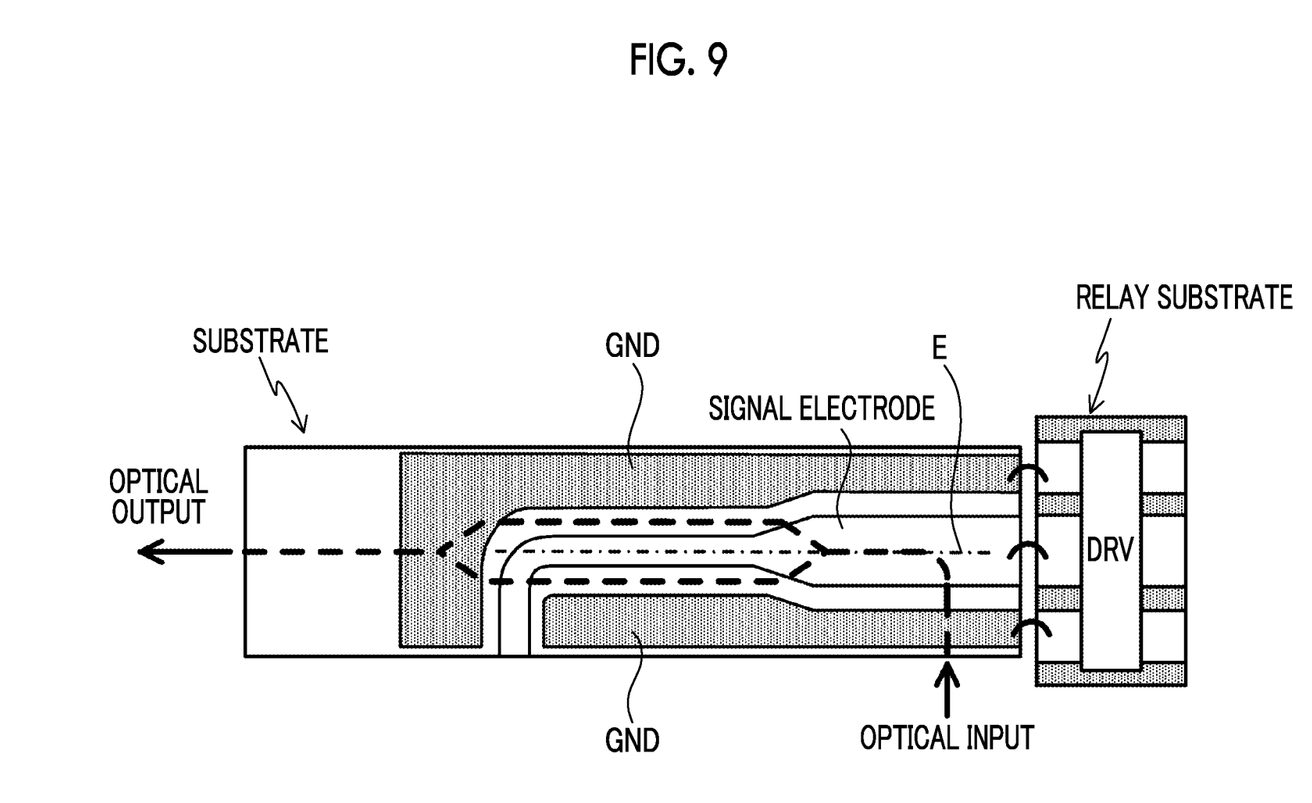
FIG. 9 is a diagram illustrating an example (3) of the optical modulation element used in the optical modulator of the present invention.

FIG. 9 is another example of an optical modulation element that can be used in the optical modulator of the present invention. The input port of the optical waveguide formed on the substrate of FIG. 9 is provided on the long side of the substrate, and as shown in FIG. 8, can be preferably used in the optical modulator having the input port of the light wave on the long side of the substrate.

The main feature of the optical modulation element of FIG. 9 is the shape of the signal electrode disposed so as to overlap the optical branching part. FIG. 9 shows an example using the signal electrode disposed along the line-symmetry axis E of the optical branching part, which is the propagation direction of the light wave passing through the optical branching part, and having a symmetrical shape with respect to the line-symmetry axis E. Since the signal electrode has a shape symmetric with respect to the above-mentioned line-symmetry axis, the influence on the branch ratio at the optical branching part is almost the same across the line-symmetry axis, so that the change in the branch ratio is suppressed from 1:1, for example. Note that FIG. 9 illustrates a state in which the driver element (DRV) is disposed on the relay substrate.

In FIG. 9, the signal electrode is set such that the width changes, and the width in an action portion with the optical waveguide is narrower than the width on the input waveguide. Of particular importance as the shape of the signal electrode is that at the position where the signal electrode crosses the optical branching part, the width of the signal electrode is three times (reference numeral D) or more the mode field diameter of the light wave propagating through the branch waveguide, shown in FIG. 5. Since such a wide signal electrode is used to cross the optical branching part (Y-branch part), the electric field applied to the waveguide is dispersed, so that the signal electrode becomes possible to function as a suppressing unit that suppresses changes in the branch ratio or the like.

In addition, the signal electrode is divided into two in the middle and then combined, and the signal electrode can be disposed so as to bypass the conversion waveguide or the like of the optical branching part (Y-branch part) at the two-divided part. As a matter of course, it is preferable that the clearance the branched signal electrodes crossing the optical branching part is wider than that of reference numeral D in FIG. 5.

Even when the signal electrode as shown in FIG. 9 is used, the resin layer as shown in FIG. 6A, 6B or 7A, 7B can be disposed at the place where the optical waveguide and the modulation electrode overlap. This makes it possible to further suppress the influence on the branch ratio of the optical branching part.

In FIG. 7A, 7B or 9, the signal electrode and the ground electrode are symmetrically disposed with respect to a part of the Mach-Zehnder type optical waveguide, particularly, the input optical waveguide and the subsequent branching waveguide. By disposing electrodes (including DC bias electrode) such as signal electrodes symmetrically with respect to the optical waveguide in this way, the internal stress applied to the optical waveguide becomes uniform or symmetric, and it is possible to suppress the occurrence of DC drift due to temperature fluctuations of the optical modulation element.

As shown in FIG. 10, a case in which light waves are input and output from and to one short side of the substrate constituting the optical modulation element will be described in more detail. FIGS. 11 and 12 show specific examples of the optical modulation element of FIG. 10, using two nested optical waveguides in which four Mach-Zehnder type optical waveguides are disposed in parallel as optical waveguides. Further, the light wave modulated by each nested optical waveguide is polarized and combined by the polarization-combining part outside the substrate, and output.

In FIGS. 11 and 12, the input and output ports of the light waves are disposed in the same short side of the substrate, so that an optical waveguide for folding the light wave input into the substrate is formed. Further, in FIGS. 11 and 12, a plurality of electrical signals (modulation signals) are input from the other short side of the substrate. Further, a terminator including a terminating resistor is connected to the terminating portion of the signal electrode to suppress reflection of an electrical signal. The terminators are separately disposed on the two long sides of the substrate, but the terminators can be integrated on one of the long sides. Further, the terminators can be disposed on the substrate by using flip chip bonding or the like.

As in FIG. 6A, 6B, in the optical modulation element of FIG. 11, a case is shown in which the signal electrode crosses the optical branching part while avoiding input waveguide of the optical branching part and the signal electrode (RF signal electrode) from overlapping, with respect to the four Mach-Zehnder type optical waveguides. Further, as in FIG. 7A, 7B, in the optical modulation element of FIG. 12, a case is shown in which the signal electrode crosses the optical branching part, while the input waveguide of the optical branching part and the signal electrode (RF signal electrode) are disposed so as to overlap, with respect to the four Mach-Zehnder type optical waveguides. Also in FIGS. 11 and 12, the resin layer is disposed at a position where the signal electrode (RF signal electrode) crosses the optical branching part to suppress the change in the branch ratio. In addition, by disposing the resin layer even at other positions where the RF signal electrode and the DC signal electrode cross the optical waveguide, it is also possible to suppress the application of the electric field of the signal electrode to the optical waveguide in an unnecessary place, and the absorption of light waves propagating through the optical waveguide by the signal electrode.

As described above, according to the present invention, it is possible to provide an optical modulator in which deterioration of transmission characteristics is suppressed even when a signal electrode crosses an optical branching part or an optical combining part.

What is claimed is:

1. An optical modulator comprising:
   a substrate on which an optical waveguide and a modulation electrode that modulates a light wave propagating through the optical waveguide are formed; and
   a case housing the substrate,
   wherein the optical waveguide includes at least an optical branching part that branches one light wave into two light waves or an optical combining part that combines two light waves into one light wave,
   the modulation electrode has a signal electrode and a ground electrode, and a part of the signal electrode is disposed so as to cross the optical branching part or the optical combining part,
   the optical modulator is provided with a suppressing unit that suppresses changes in an intensity ratio of the light waves branched at the optical branching part or an intensity ratio of the light waves combined at the optical combining part, by the signal electrode that crosses the optical branching part or the optical combining part, and
   an interface part that is provided in the case, and supplies electrical signals to the modulation electrode is formed in a vicinity of a position in which an extension line of a line-symmetry axis of the optical branching part or the optical combining part, which is a propagation direction of the light wave passing through the optical branching part or the optical combining part, intersects with a side surface of the case.

2. The optical modulator according to claim 1, wherein the optical branching part or the optical combining part includes a Y-branch part,
   the Y-branch part includes one input and output waveguide having a waveguide width W corresponding to a single mode, a conversion waveguide connected to the input and output waveguide and having a waveguide width wider than the waveguide width W, and two branch waveguides connected to the conversion waveguide, and
   a position where the signal electrode crosses the optical branching part or the optical combining part is the conversion waveguide or any one of the two branch waveguides within a range from the conversion waveguide to the two branch waveguides between which a distance is separated by three times a mode field diameter of the light wave propagating through the branch waveguides.

3. The optical modulator according to claim 2, wherein the suppressing unit is a resin layer provided between the optical branching part or the optical combining part and the modulation electrode.

4. The optical modulator according to claim 3, wherein a length of a portion where the modulation electrode and the resin layer overlap is set to 1/10 or less of a wavelength of a modulation signal.

5. The optical modulator according to claim 2, wherein the suppressing unit is disposed along a line-symmetry axis of the optical branching part or the optical combining part, which is a propagation direction of the light wave passing through the optical branching part or the optical combining part, and has a shape symmetrical with respect to the line-symmetry axis, and a width of the signal electrode is at least three times the mode field diameter of the light wave propagating through the branch waveguide, in the position where the signal electrode crosses the optical branching part or the optical combining part.

6. An optical modulator comprising:
a substrate on which an optical waveguide and a modulation electrode that modulates a light wave propagating through the optical waveguide are formed; and
a case housing the substrate,
wherein the optical waveguide includes at least an optical branching part that branches one light wave into two light waves or an optical combining part that combines two light waves into one light wave,
the modulation electrode has a signal electrode and a ground electrode, and a part of the signal electrode is disposed so as to cross the optical branching part or the optical combining part,
the optical modulator is provided with a suppressing unit that suppresses changes in an intensity ratio of the light waves branched at the optical branching part or an intensity ratio of the light waves combined at the optical combining part, by the signal electrode that crosses the optical branching part or the optical combining part,
the optical branching part or the optical combining part includes a Y-branch part,
the Y-branch part includes one input and output waveguide having a waveguide width W corresponding to a single mode, a conversion waveguide connected to the input and output waveguide and having a waveguide width wider than the waveguide width W, and two branch waveguides connected to the conversion waveguide, and
a position where the signal electrode crosses the optical branching part or the optical combining part is the conversion waveguide or any one of the two branch waveguides within a range from the conversion waveguide to the two branch waveguides between which a distance is separated by three times a mode field diameter of the light wave propagating through the branch waveguides.

7. The optical modulator according to claim 6, wherein the suppressing unit is a resin layer provided between the optical branching part or the optical combining part and the modulation electrode.

8. The optical modulator according to claim 7, wherein a length of a portion where the modulation electrode and the resin layer overlap is set to 1/10 or less of a wavelength of a modulation signal.

9. The optical modulator according to claim 6, wherein the suppressing unit is disposed along a line-symmetry axis of the optical branching part or the optical combining part, which is a propagation direction of the light wave passing through the optical branching part or the optical combining part, and has a shape symmetrical with respect to the line-symmetry axis, and a width of the signal electrode is at least three times the mode field diameter of the light wave propagating through the branch waveguide, in the position where the signal electrode crosses the optical branching part or the optical combining part.

* * * * *